US009446916B2

(12) United States Patent
Marchesini et al.

(10) Patent No.: US 9,446,916 B2
(45) Date of Patent: Sep. 20, 2016

(54) LOADING APPARATUS OF A SILO

(75) Inventors: Vainer Marchesini, San Prospero (IT);
Luca Golinelli, San Possidonio (IT)

(73) Assignee: WAM INDUSTRIALE S.P.A., Modena (IT)

( * ) Notice: Subject to any disclaimer, the term of this patent is extended or adjusted under 35 U.S.C. 154(b) by 526 days.

(21) Appl. No.: 13/517,324

(22) PCT Filed: Dec. 23, 2010

(86) PCT No.: PCT/IB2010/003339
§ 371 (c)(1),
(2), (4) Date: Aug. 2, 2012

(87) PCT Pub. No.: WO2011/077237
PCT Pub. Date: Jun. 30, 2011

(65) Prior Publication Data
US 2012/0301230 A1    Nov. 29, 2012

(30) Foreign Application Priority Data
Dec. 24, 2009  (IT) .............................. BO2009A0824

(51) Int. Cl.
*B65G 51/30* (2006.01)
*B65G 53/66* (2006.01)

(52) U.S. Cl.
CPC ..................... *B65G 53/66* (2013.01)

(58) Field of Classification Search
USPC ...... 406/42, 52, 75, 139, 172, 198; 414/291, 414/373, 518
See application file for complete search history.

(56) References Cited

U.S. PATENT DOCUMENTS

| | | | |
|---|---|---|---|
| 2,795,463 A * | 6/1957 | Weller | 406/67 |
| 3,069,205 A * | 12/1962 | McIver et al. | 406/15 |
| 3,739,893 A * | 6/1973 | Kaufmann | B65G 69/186 141/93 |
| 4,017,281 A * | 4/1977 | Johnstone | B01D 46/0057 15/340.1 |
| 4,147,392 A * | 4/1979 | Fuss | 406/39 |
| 4,802,796 A | 2/1989 | Braennstroem | |
| 4,844,665 A * | 7/1989 | Howell | B01D 46/0005 406/172 |
| 5,071,290 A * | 12/1991 | Johnson | B60P 1/60 406/145 |
| 5,518,343 A * | 5/1996 | Howell | 406/38 |
| 6,045,298 A * | 4/2000 | Lytle | 406/48 |
| 6,089,795 A * | 7/2000 | Booth | 406/43 |
| 6,502,689 B2 * | 1/2003 | Mitchell | B65G 19/14 198/550.8 |
| 6,715,702 B2 * | 4/2004 | McPherson | E01C 19/20 239/663 |
| 7,410,583 B2 * | 8/2008 | Gray (Gabb) et al. | 210/603 |
| 8,360,691 B2 * | 1/2013 | Moretto | 406/17 |
| 8,622,135 B2 * | 1/2014 | Smartt et al. | 166/308.1 |
| 8,992,133 B2 * | 3/2015 | Sundholm | 406/197 |
| 2009/0285643 A1* | 11/2009 | Brown | 406/41 |
| 2012/0020747 A1* | 1/2012 | Schneider et al. | 406/121 |
| 2012/0196241 A1* | 8/2012 | Koyama et al. | 432/86 |
| 2013/0336730 A1* | 12/2013 | Alenizi | 406/108 |

FOREIGN PATENT DOCUMENTS

| | | |
|---|---|---|
| DE | 3224965 | 1/1984 |
| SU | 713795 | 2/1980 |

* cited by examiner

*Primary Examiner* — Joseph Dillon, Jr.
(74) *Attorney, Agent, or Firm* — Leason Ellis LLP

(57) ABSTRACT

A loading apparatus of a silo includes a pneumatic filling circuit connecting the silo to a tanker for transporting a granular or powdery material and a filtering device suitable to filter the compressed transport gas coming out of the silo. A recovery device of at least part of the energy contained in the compressed transport gas of the granular or powdery material is arranged between the tanker and the silo.

14 Claims, 2 Drawing Sheets

LOADING APPARATUS OF A SILO

TECHNICAL FIELD

The present invention refers to a loading apparatus of a silo able to exploit the energy of the loading fluid of the granular or powdery material in the silo.

Such apparatus is generally comprised of:
a pneumatic filling circuit that connects at least one silo with a transport means; and
at least one filter able to filter the transport gas coming out of the silo.

BACKGROUND ART

As is known, a tanker for transporting granular or powdery material comprises a barrel-shaped container, fitted to the chassis of the motor vehicle. The container contains a certain quantity of granular or powdery material and compressed air generated by a compressor, which is frequently located on-board the transport means. After establishing the pneumatic connection between the barrel of the tanker and the silo, by means of the above-mentioned pneumatic circuit, the compressed air pushes the granular or powdery product towards the silo.

Apart from the problems related to filtering the compressed air coming out of the silo, systems of this type also involve a further problem tied to the fact that a significant amount of the energy used to transfer the material from the tanker to the silo is dissipated in that the mix entering the silo is normally characterised by kinetic energy in excess of that necessary merely to transport the material. Such excess energy is dissipated, on the one hand, in the form of vortices and swirling of the material inside the silo while, on the other, the energy is lost when the transport gas is discharged into the external environment.

DISCLOSURE OF INVENTION

Therefore, the main aim of the present invention is to provide a loading apparatus of a silo able to exploit at least part of the energy contained in the loading fluid of the granular or powdery material in said silo. As described herein, such energy can be exploited directly or converted into electrical energy and possibly stored in a battery assembly for subsequent use.

Therefore, according to this invention, there is provided a loading apparatus of a silo as claimed in claim 1 or in any of the claims depending directly or indirectly on claim 1.

BRIEF DESCRIPTION OF THE DRAWINGS

The present invention will now be described with reference to the accompanying drawings which illustrate some non-limiting forms of embodiment; in which.

BEST MODE FOR CARRYING OUT THE INVENTION

Figure 1:
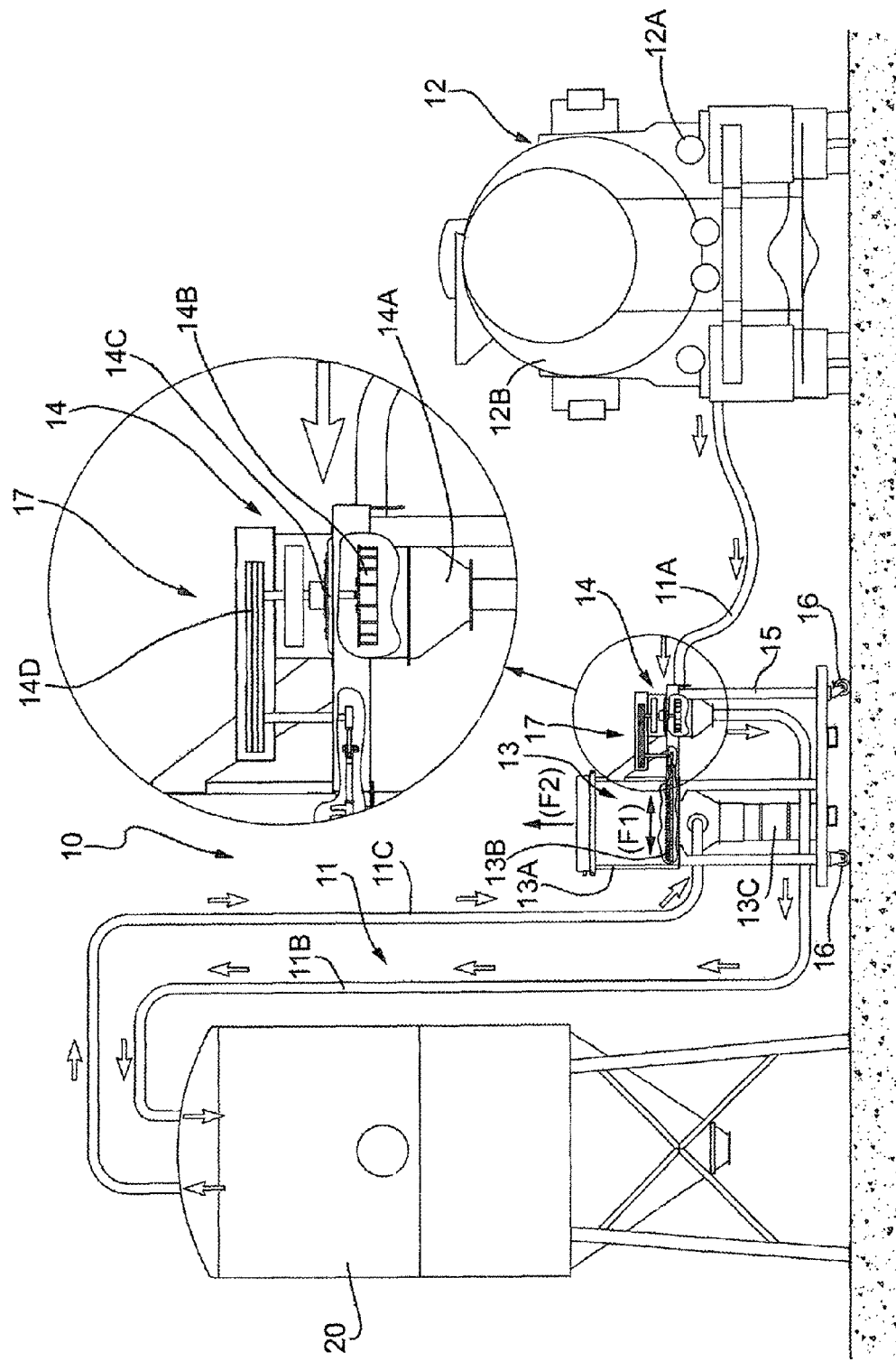
FIG. 1 (and relative enlargement) illustrates a first embodiment of a loading apparatus of a silo according to the present invention.

In FIG. 1, designated as a whole by number 10 is a loading apparatus of a silo 20 according to the present invention.

The apparatus 10 comprises:
a pneumatic filling circuit 11 connecting the silo 20 to a tanker 12; and
a filtering device 13 able to filter the compressed air coming out of the silo 20.

The tanker 12 comprises, in a conventional manner, a chassis 12A that, in turn, supports a barrel-shaped container 12B housing the material (powdery or granular) and a certain quantity of compressed air produced by a compressor (not shown) which is for example also mounted on the chassis 12A.

As shown in FIG. 1, in this particular embodiment an energy recovery device 14 able to recover (harness) at least part of the energy contained in the loading fluid is arranged between the tanker 12 and the silo 20.

The structure and functions of the recovery device 14 will be described in further detail below.

Analysing the embodiment of FIG. 1, the pneumatic circuit 11 comprises:
a first delivery branch 11A, pneumatically connecting the container 12B to the recovery device 14;
a second delivery branch 11B connecting the recovery device 14 and the silo 20, the delivery branches 11A, 11B being arranged in series; and
a return branch 11C pneumatically connecting the silo 20 to the filtering device 13.

In the embodiment illustrated in FIG. 1, the filtering device 13 and the energy recovery device 14 are mounted on a carriage 15 resting on a plurality of wheels 16 for the purposes that will be illustrated below.

The assembly comprising the carriage 15, the filtering device 13 and the recovery device 14 forms a self-propelled unit 17 in which the two operations of recovering part of the energy contained in the material/compressed air mix coming from the container 12B, and filtering the air coming out of the silo 20 by means of the filtering device 13 are performed.

In particular, the filtering device 13, powered by air arriving from the silo 20 (through the branch 11C), comprises a container 13A housing a plurality of substantially vertical filtering elements (not shown). Such filtering elements are shaken by a shaking device 13B that may be arranged on the bottom of the container 13A. Generally, at least one filtering element is associated with each shaking device 13B and is shaken by said shaking device 13B when this moves cyclically in the two directions indicated by a double-point arrow (F1). As the filtering elements are shaken the powders become detached from their surface and fall due to the force of gravity into a storage unit 13C located below the container 13A. After filtering as it passes through the fabric of the filtering elements, the air can thus be discharged into the environment in a substantially vertical direction indicated by an arrow (F2).

The energy recovery device 14, in turn, comprises a coil 14A that houses a rotor 14B (for example a turbine device). A shaft 14C leading from the rotor 14B is linked to a mechanism 14D (for example a connecting rod/crank mechanism) for transforming the rotary motion of the shaft 14C into linear alternate motion in the aforesaid direction (F1). Said mechanism 14D is coupled to the shaking device 13B in such a way as to cause cyclic motion of the shaking device 13B in the direction (F1) in order to obtain shaking of the filtering elements.

In another embodiment which is not shown, the shaking device is suitable for use in a circular filter. For example, in this case, the shaking device could comprise at least one blade arranged on a circular frame that hits/shakes the filtering elements.

The loading apparatus 10 of the silo 20 functions as follows:

(a) the material/compressed air mix is conveyed from the container 12B to the energy recovery device 14 by means of the branch 11A;

(b) the mix flows into the coil 14A and causes the rotor 14B to turn which, in turn, transfers the motion to the mechanism 14D which, in turn, imparts cyclic motion to the shaking device 13B (according to the arrow F1) thereby causing the desired shaking of the filtering elements so as to avoid any clogging of these by the powder contained in the mix returning from the silo 20 by means of the branch 11C.

It is obvious that the amount of energy recovered in the rotor 14B must be such as not to hinder or even prevent correct transport of the material/compressed air mix from the container 12B to the silo 20 which is, in fact, the main purpose of the plant.

The fact that, in the particular embodiment shown in FIG. 1, the filtering device 13 and the energy recovery device 14 are mounted on a single self-propelled unit 17 has the advantage that said self-propelled unit 17 can be moved (manually or by mechanical means, not shown) from one silo to another to carry out the desired functions of filtering the air and recovering part of the loading energy.

In another embodiment that is not illustrated, the rotor 14B is linked to an electric generator (not shown) able to transform the mechanical energy furnished by the shaft 14C into electrical energy that can be used immediately or stored in a battery assembly (not shown) for subsequent use of said electrical energy.

For example, the electrical energy produced can be used to cyclically move the shaking device 13B or the blade type device (not illustrated) with a circular motion or, using methods known in the prior art, to generate compressed air which, delivered by specific nozzles (not shown), is used for cleaning the filtering elements and/or other parts of the plant that require continuous cleaning.

Figure 2:
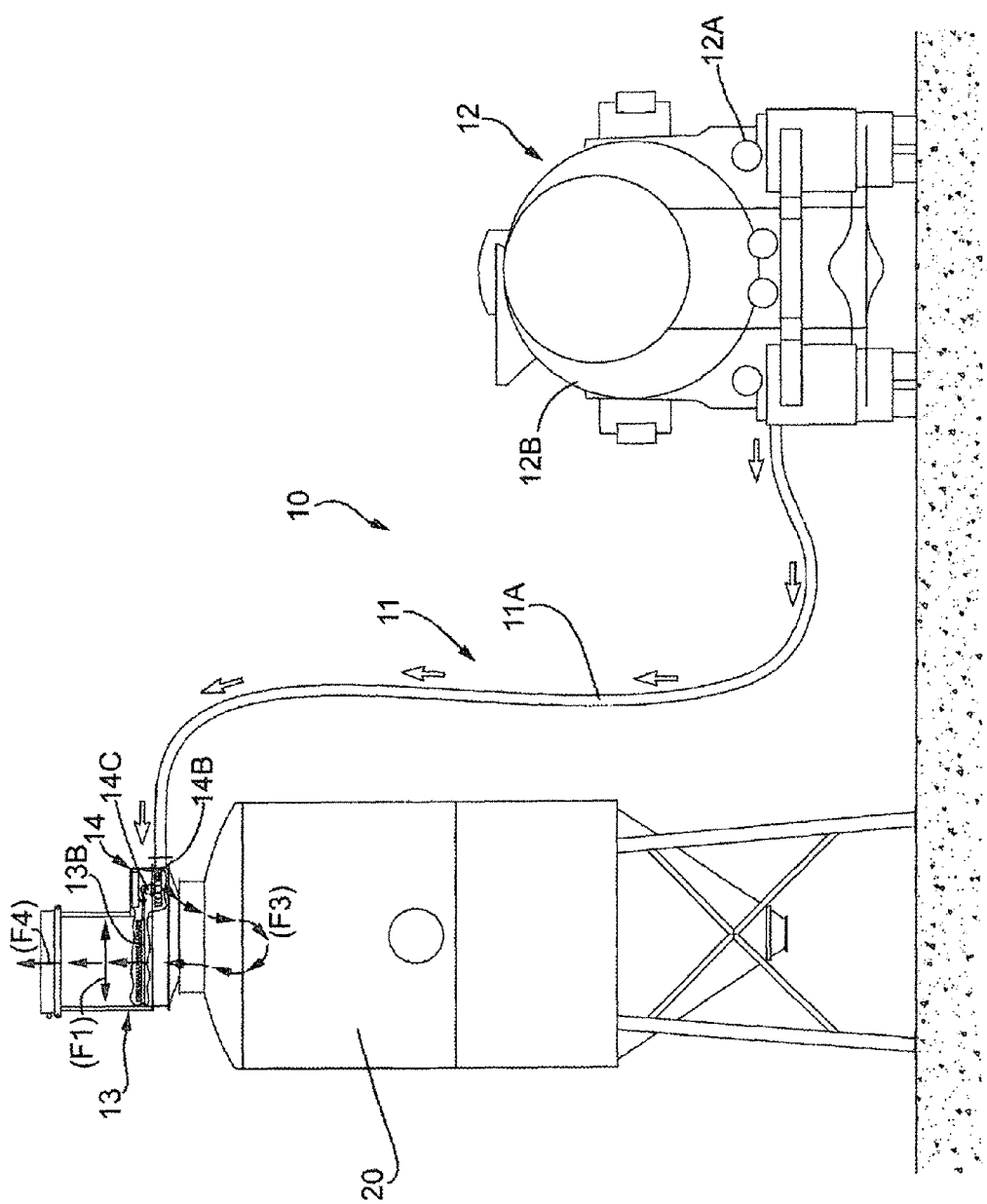
FIG. 2 shows a second embodiment of a loading apparatus of a silo according to the present invention.

In the second embodiment shown in FIG. 2, the same reference numbers have been used to identify elements similar or identical to those shown in FIG. 1 (first embodiment).

In the second embodiment illustrated in FIG. 2, the filtering device 13 and the energy recovery device 14 are mounted on the top of the silo 20.

In this case, the pneumatic circuit 11 comprises only the delivery branch 11A that pneumatically connects the container 12B to the recovery device 14.

The material/compressed air mix is sent first of all to the recovery device 14 by means of the delivery branch 11A. Part of the energy is recovered in the recovery device 14 with the system already described with reference to the embodiment illustrated in FIG. 1. Such energy may be used to cyclically move the shaking device 13B in the manner described previously, or to generate electrical energy by means of a generator mechanically linked to the shaft 14C. In this solution the compressed air, mixed with the material to be transported, enters the silo 20 in the direction indicated by an arrow (F3). After depositing most of the powdery or granular material in the silo 20, the air is vented upwards (in a direction indicated by an arrow (F4)), passing through the filtering elements of the filtering device 13 where the lighter particles that have not yet fallen into the silo 20 are released.

The solution illustrated in FIG. 2 has the advantage of having a simplified version of the pneumatic circuit 11 that comprises only the delivery branch 11A with, however, the drawback that each silo must have its respective assembly comprising the devices 13, 14.

Also in this case, the rotor 14B is connected to an electric generator (not shown) able to transform the mechanical energy furnished by the shaft 14C into electrical energy that can be used immediately or stored in a battery assembly (not shown) for subsequent use of the electrical energy.

Also in the second embodiment illustrated in FIG. 2, the electrical energy produced can be used to cyclically move the shaking device 13B or, using methods known in the prior art, to generate compressed air which, delivered by specific nozzles (not shown), is used for cleaning the filtering elements and/or other parts of the plant that require continuous cleaning.

In a further embodiment not shown, the recovery device 14 is mounted directly on the tanker 12 (in particular on its chassis 12A), while the filtering device 13 can be detached from the silo 20 and from the tanker 12, and in particular may be self-propelled.

A solution is also possible in which both the filtering device 13 and the recovery device 14 are mounted on the tanker 12.

Partly summarising that outlined above, by way of some non-limiting examples, the energy recovered by means of the rotor 14B during loading of a silo 20 can be used for the following applications:

1) oscillation of the filtering elements of the filter applied to the silo to obtain shaking of the filtering elements and therefore efficient cleaning of said filter;
2) activation of a striker to strike the filtering elements in a vertical direction to remove the powder;
3) activation of an electric alternator to produce the electrical current necessary to operate a timing or sequencing electronic card for filter cleaning systems;
4) activation of an electric alternator to produce the electrical current necessary to activate coils that control the solenoid valves of pneumatic actuators mounted for example on vent valves or valves that control the flow of material (blade valves, butterfly valves and sleeve valves);
5) transmission of rotary motion to small compressors able to produce the compressed air necessary for back current cleaning of powder removal filters, or to control the pneumatic actuators mounted for example on valves;
6) activation of an electric alternator to produce the electrical current necessary to activate a small compressor with the functions described in the previous point;
7) activation of vibrating bases to make the material fall and prevent bridging or rat holing;
8) activation of compressed air vibrators, strikers or cannon systems;
9) activation of level measurement and safety systems for measuring the correct operating parameters of a silo (for example, silo internal pressure measurement appliances).

To the person skilled in the art it will be clear that the teachings of the present invention can be applied, possibly with obvious variants, to devices not included in the previous non-exhaustive list.

The main advantage of the loading apparatus of a silo according to the present invention consists in the fact that use of this device permits recovery of at least part of the energy of the loading fluid of the granular or powdery material, which would otherwise be dissipated; said energy can be exploited directly or converted into electrical energy and possibly stored in a battery assembly for subsequent use.

The invention claimed is:

1. A loading apparatus of a silo; said apparatus comprising:
   a pneumatic filling circuit connecting the silo to transport means of a granular or powdery material, the pneumatic filling circuit being configured such that a transported fluid delivers the granular or powdery material from the transport means to the silo;
   first device arranged between said transport means and said silo; the first device being configured such that at least part of the energy contained in the transported fluid is harnessed by the first device; and
   an energy-exploiting device that is operatively coupled to the first device such that the energy harnessed by the first device drives operation of the energy exploiting device;
   wherein the first device comprises a coil that houses a rotor, the rotor being linked to a mechanism that is configured to transform a continuous rotary motion of the rotor into an alternate motion of the energy-exploiting device.

2. The loading apparatus according to claim 1, wherein the energy-exploiting device is a filtering device to filter a transport gas coming out of the silo.

3. The loading apparatus according to claim 1, wherein the mechanism is coupled to the energy-exploiting device which includes a shaking device belonging to a filtering device so that said shaking device undergoes a linear, or a rotary, cyclic motion in order to shake a plurality of filtering elements contained in said filtering device.

4. The loading apparatus according to claim 3, wherein the shaking device is a comb device.

5. The loading apparatus according to claim 3, wherein the rotor is linked to an electric generator which is configured to transform mechanical energy coming out of said rotor into electrical energy.

6. The loading apparatus according to claim 5, wherein the electrical energy produced by the electric generator is used for cyclically moving said shaking device.

7. The loading apparatus according to claim 5, wherein the electrical energy produced by the electric generator is used to produce compressed air which is used for cleaning said filtering device and/or other parts of the plant.

8. The loading apparatus according to claim 2, wherein said filtering device and said first device are arranged so as to form a portable unit.

9. The loading apparatus according to claim 2, wherein the said filtering device is detached from said silo and from said transport means.

10. The loading apparatus according to claim 2, wherein said pneumatic circuit comprises: a first delivery branch, pneumatically connecting a material container that is part of the transport means to said first device; a second delivery branch connecting said first device and said silo; said delivery branches being arranged in series; and a return branch pneumatically connecting said silo to said filtering device for delivering the transport gas coming out of the silo to the filtering device for filtering thereof.

11. The loading apparatus according to claim 1, wherein the rotor is linked to a rod/crank mechanism that is configured to transform a continuous rotary motion of the rotor into a reciprocating linear motion of the energy exploiting device.

12. The loading apparatus according to claim 1:
   wherein the transported fluid delivers the granular or powdery material from the transport means to the silo via a first delivery branch;
   wherein the first device partitions the first delivery branch into a first section between the transport means and the first device and a second section between the first device and the silo; the rotor being disposed in a flow path of the granular or powdery material and the transported fluid such that the transported fluid drives rotation of the rotor; and
   wherein the energy-exploiting device comprises a filtering device that is connected to the silo by a return branch, wherein the filtering device is mechanically connected to the first device such that rotation of the rotor is translated into movement of the filtering device to facilitate filtering return fluid that is transported through the return branch from the silo to the filtering device.

13. The loading apparatus according to claim 12, wherein the rotor is linked to a rod/crank mechanism that is configured to transform a continuous rotary motion of the rotor into a reciprocating linear motion of the filtering device.

14. The loading apparatus according to claim 12, wherein the filtering device includes a shaking device that undergoes a linear, or a rotary, cyclic motion in order to shake a plurality of filtering elements contained in the filtering device in response to rotation of the rotor.

* * * * *